Figure 1:
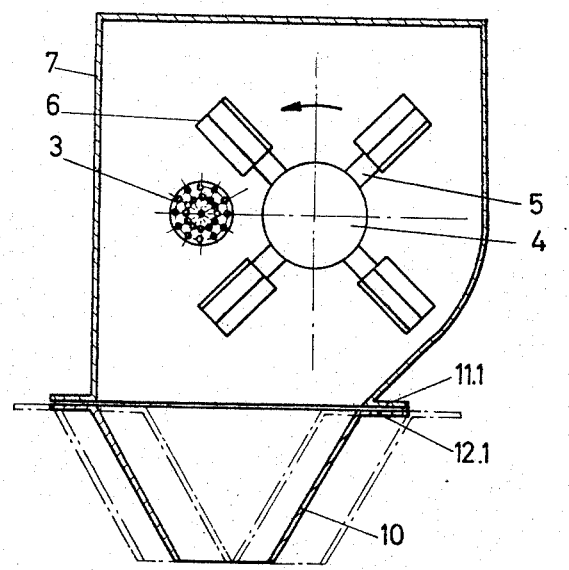

Aug. 1, 1967  H. LIST ETAL  3,333,298
GRANULATING MACHINES
Filed Dec. 24, 1964  4 Sheets-Sheet 1

Inventors
Heinz List, Fritz Ronner
By Richard Ernst
Ag't

Aug. 1, 1967 H. LIST ETAL 3,333,298
GRANULATING MACHINES

Filed Dec. 24, 1964 4 Sheets-Sheet 2

Inventors
Heinz List, Fritz Ronner

Inventors
Heinz List, Fritz Ronner
By Richard [signature]
Agt

United States Patent Office 3,333,298
Patented Aug. 1, 1967

3,333,298
GRANULATING MACHINES
Heinz List, St. Jakobstrasse 43, and Fritz Ronner, St. Albanstrasse 6, both of Pratteln, Switzerland
Filed Dec. 24, 1964, Ser. No. 420,916
Claims priority, application Switzerland, Dec. 30, 1963, 16,102/63
7 Claims. (Cl. 18—12)

The present invention concerns granulating machines of the kind in which strands of plastic material are pressed through an extruder head and are cut into granules by means of a revolving cutter and thereafter fall into a receptacle located below the cutter. It is found that difficulties arise when the granulated particles are formed whilst the plastic material is still warm and soft since they tend to stick together. When the granules stick together difficulties arise in connection with their removal from the cutter and thus the normal working of the machines is affected.

In an attempt to overcome the above outlined difficulties it has been proposed to cool the extruder head and cutter and the receptacle for the granules so that they become cooled and hardened on their surface at least. Gas and liquid cooling media have both been proposed. In the known process just referred to an air stream is used to cool the granules which are subsequently conveyed from the receptacle into a separating plant. If, however, plastic material is worked at high temperatures, then wet granulation is necessary and the particles are so soft and sticky that cooling, for example by water, is required after granulation. In wet granulation the individual particles must not only be cooled to such an extent that they no longer stick to one another when being transported away but great care has to be taken that they do not stick to the inner wall of the receptacle when they fall from the cutter and bounce off the receptacle wall. It has been proposed thoroughly to wet the inner wall of the receptacle at the places where the granules come into contact therewith and to shape the receptacle in such a way that the particles bounce on the inner wall at the optimum angle. Good results may be obtained by using the proposed system provided that the direction of flight of the granules remains substantially constant when the machine is in operation. Experience has however shown that the direction of flight does not always remain constant but varies in accordance with the type of product being granulated and the speed of operation of the machine. If then the particles bounce on parts of the receptacle which are insufficiently wetted or if the angle of contact is unfavourable, the particles stick so that a good result cannot be obtained from the granulation.

The object of the invention is to provide a granulating machine with an arrangement by which the aforesaid disadvantages are obviated.

According to the present invention a granulating machine in which strands of thermoplastic material are extruded, and the extruded strands are cut into granules by means of a revolving knife is provided with a receptacle for the granules consisting of a stationary upper portion and a movable lower portion the latter being displaceable and capable of being secured in a pre-determined position relative to the upper part.

Preferably the lower portion slidably abuts the upper portion along a flat plane, there being means for securing the lower portion in a predetermined position relative to the upper portion.

In a further preferable form the lower portion is pivotally attached to the upper portion, the abutting surfaces of the upper and lower parts being of arcuate form, the centre of curvature being substantially parallel to the axle of the cutting device.

Figure 1A:
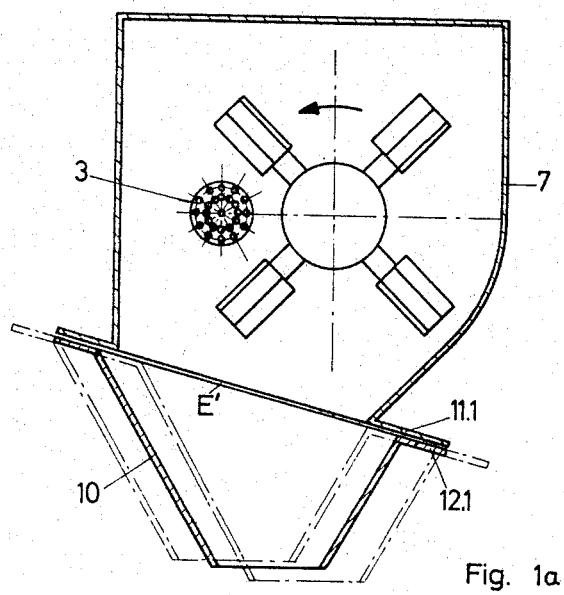
Figure 2:
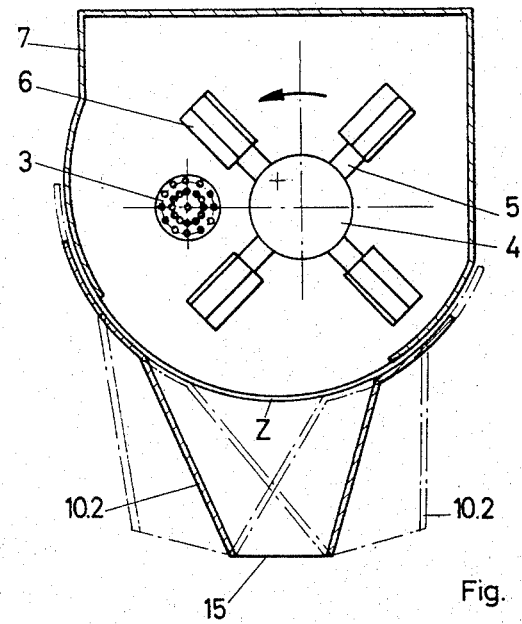
Figure 2A:
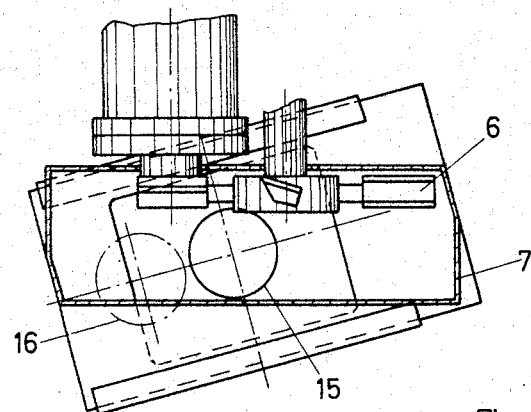
Figure 3:
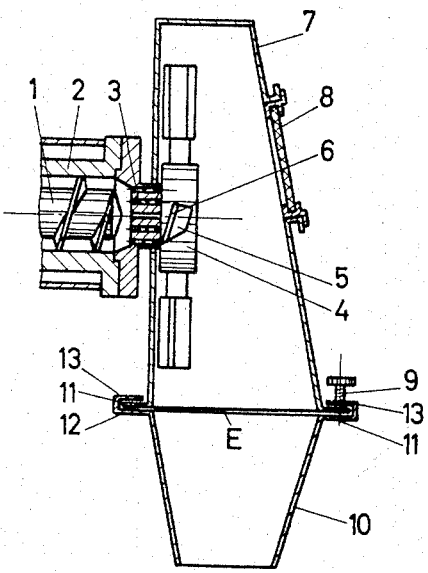
Figure 3A:
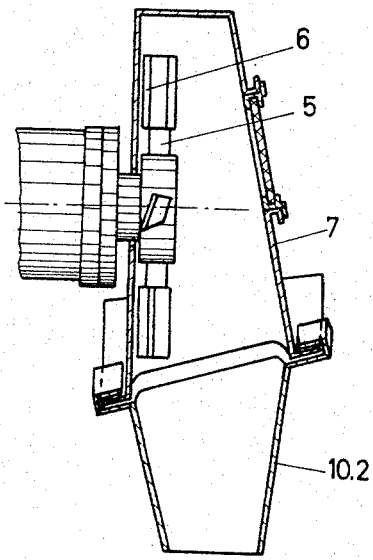
Figure 4:
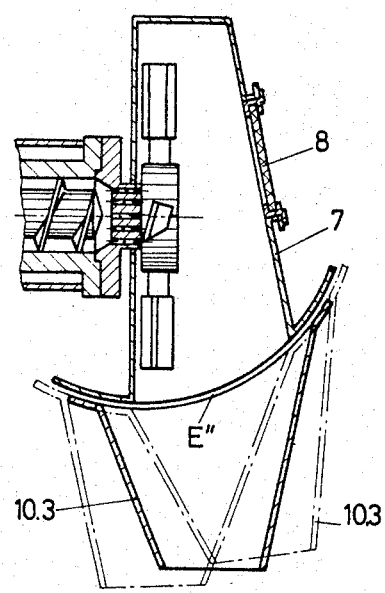
Figure 5:
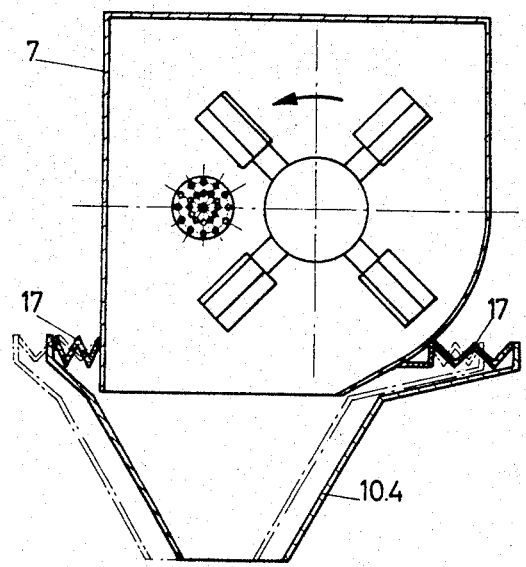

The invention will be described further, by way of example, with reference to the accompanying drawings in which:

FIG. 1 shows a first embodiment of the invention in front-elevational section;
FIG. 1a shows a modification of the apparatus of FIG. 1;
FIG. 2 shows another embodiment in a view similar to that of FIG. 1;
FIG. 2a shows the apparatus of FIG. 2 in plan section on the extruder axis;
FIG. 3 shows the apparatus of FIG. 1 in side elevational section on the extruder axis;
FIG. 3a shows the appartus of FIG. 2 in a view corresponding to FIG. 3;
FIG. 4 shows a modification of the apparatus of FIG. 2 in a view corresponding to that of FIG. 3; and
FIG. 5 shows an additional modification of the invention in front elevational section.

The granulating machine shown in FIGS. 1 and 3, has an extruder screw 1 rotatably mounted in a barrel or housing 2. A perforated die plate 3 forms an end wall for the barrel 2. A shaft 4 mounted in fixed spatial relationship to the housing is provided with spokes 5 on which knives 6 are secured for movement across the outer face of the die plate 3 when the shaft 4 rotates. The cutting area near the die plate 3 and the knives 6 is enclosed by the substantially closed upper portion 7 of a receptacle having a window 8 which permits inspection of the cutting process. The downwardly open lower receptacle portion 10 is adjustably fastened to the upper portion.

The engaged sealing faces of the two receptacle portions 7, 10 are located in a horizontal surface E, engagement between the receptacle portions being provided by front and rear flanges 11 and lateral flanges 11.1 on the receptacle portion 7, and corresponding flanges 12 and 12.1 on the lower receptacle portion 10. The edge portions 13 of the flanges 12 are folded over so that the flanges 12 define open channels in which the flanges 11 are received for movement in the plane E. A fastening screw 9 threadedly mounted in a flange portion 13 for engaging a flange 11 permits the position of the lower receptacle portion 10 on the upper portion 7 to be fixed within the limits indicated in broken lines in FIG. 1. Seals (not shown) may be provided between the flanges 11 and 12.

In the modified arrangement shown in FIG. 1a, the receptacle portions 7.1 and 10.1 engage each other along a plane E' which is obliquely inclined relative to a vertical direction, the arrangement otherwise being identical with the showing of FIGS. 1 and 3.

In the embodiment of the invention illustrated in FIGS. 2, 2a, and 3a, the upper and lower receptacle portions 7.2, 10.2 have cylindrically curved wall portions which engage each other along a cylindrical surface Z whose axis is horizontal, but obliquely inclined relative to the parallel, horizontal axes of the extruder screw 1 and of the cutter shaft 4. The lower receptacle portion 10.2 may thus be displaced on the upper portion 7.2 between the positions indicated in broken lines in FIG. 2. The circular bottom opening 15 of the lower receptacle portion may be shifted both transversely of the extruder axis and in the direction of the axis from the position 15 to the position 16 shown in FIG. 2a, the arrangement being otherwise analogous to FIG. 1, the receptacle portions having engaged flanges. The position 16 of the bottom opening is preferred at high speeds of the cutter shaft 4.

FIG. 4 shows yet another embodiment of the invention in which respective flanges of upper and lower receptacle portions 7.3 and 10.3 define a spherical surface E″ along which the lower receptacle portion may move on the fixed upper portion 7.3. The surface E″ is centered in the axis of the rotary cutter 4, 5, 6.

In the granulating machine partly shown in FIG. 5, the upper and lower portions 7.4 and 10.4 of the receptacle which encloses the extrusion die and cutter are sealingly connected by a corrugated membrane 17 which permits horizontal movement of the lower receptacle portion 10.4 on the upper portion 7.4 as partly indicated in broken lines, the lower receptacle part 10.4 being suspended from the upper portion 7.4 in a manner not further illustrated.

Finally reference is made to FIG. 5 in which the lower portion 10.4 is loosely hung on to the upper portion 7. A flexible sleeve 17 serves as a seal between the two portions. The suspension is not shown in detail on the drawing since it can be of any desired form.

The several embodiments of the invention permit the position of the lower receptacle portion on the upper portion to be adjusted according to the speed of the rotary cutter and the resulting trajectory of the cut granules. The devices of the invention in which the lower receptacle portion moves on the fixed receptacle portion along a surface E″, Z of arcuate cross section permit the angle of incidence of the granules on the receptacle wall to be held substantially constant under different operating conditions. The arrangement shown in FIGS. 2, 2a, 3a in which the lower receptacle portion 10.2 may be moved about an axis obliquely inclined relative to the extruder and cutter axes, permits the cut extrudate to be directed against any desired wall portion of the lower receptacle portion.

What we claim is:
1. A granulating arrangement for plastics comprising, in combination:
    (a) an extruder including a perforated die member and means for extruding the plastic to be granulated in a continuous strand through said die member in a predetermined direction;
    (b) rotary cutter means including a knife member and means for moving the knife member in a circular path transversely of said direction adjacent a face of said die member for cutting the extruded strand into a plurality of granules, whereby the cut granules are centrifugally discharged in different directions and at different velocities at different speeds of movement of said knife in said path;
    (c) a receptacle having an upper portion substantially enclosing said knife member and said face of the die member during said extruding of said plastic and said cutting of said strand, and a lower portion formed with a downward opening, said upper receptacle portion being mounted in fixed spatial relationship to said die member and to said cutter means and said receptacle portions jointly defining a receptacle cavity, said lower portion having a wall portion in said cavity; and
    (d) securing means securing said lower receptacle portion to said upper portion for movement between a plurality of positions in which said granules are discharged against said wall portion at said different speeds of said cutter means respectively.
2. An arrangement as set forth in claim 1, wherein said securing means include means for fixing the relative position of said receptacle portions in each of said positions of the lower receptacle portion.
3. An arrangement as set forth in claim 2, wherein said securing means include means for moving said lower receptacle portion between said positions thereof in a plane.
4. An arrangement as set forth in claim 3, wherein said plane is obliquely inclined relative to the vertical direction.
5. An arrangement as set forth in claim 2, wherein said securing means include means for moving said lower receptacle portion between said positions thereof in an arc about an axis substantially parallel to the axis of said circular path.
6. An arrangement as set forth in claim 2, wherein said securing means include means for moving said lower receptacle portion between said positions thereof in a path defining a portion of a sphere substantially centered in the axis of said circular path.
7. An arrangement as set forth in claim 2, further comprising a flexible diaphragm sealingly connecting said receptacle portions.

References Cited
UNITED STATES PATENTS

| | | | |
|---|---|---|---|
| 1,131,192 | 3/1915 | White. | |
| 1,247,480 | 11/1917 | Adams | 93—3 |
| 1,810,512 | 6/1931 | Worst | 193—3 |
| 1,946,740 | 2/1934 | Hall | 18—12 X |
| 2,065,141 | 12/1936 | Meakin | 18—12 X |
| 3,080,033 | 3/1963 | Scott et al. | 193—3 X |

WILLIAM J. STEPHENSON, *Primary Examiner.*